(12) United States Patent
Alain

(10) Patent No.: US 8,006,404 B2
(45) Date of Patent: Aug. 30, 2011

(54) METHOD AND DEVICE FOR ADJUSTING THE FITTING DEPTH OF A TOOL IN A TOOL-HOLDER

(75) Inventor: Freyermuth Alain, Pfaffenhoffen (FR)

(73) Assignee: E.P.B., Bouxwiller (FR)

( * ) Notice: Subject to any disclaimer, the term of this patent is extended or adjusted under 35 U.S.C. 154(b) by 154 days.

(21) Appl. No.: 11/991,995

(22) PCT Filed: Sep. 12, 2006

(86) PCT No.: PCT/FR2006/050874
§ 371 (c)(1),
(2), (4) Date: Nov. 17, 2008

(87) PCT Pub. No.: WO2007/031682
PCT Pub. Date: Mar. 22, 2007

(65) Prior Publication Data
US 2011/0107577 A1 May 12, 2011

(30) Foreign Application Priority Data

Sep. 13, 2005 (FR) ...................................... 05 09339

(51) Int. Cl.
*B23Q 17/24* (2006.01)
*B27G 23/00* (2006.01)
*G01B 3/28* (2006.01)

(52) U.S. Cl. ............................................ 33/626; 33/201
(58) Field of Classification Search ................... 33/201, 33/502, 542, 626, 836
See application file for complete search history.

(56) References Cited

U.S. PATENT DOCUMENTS

| | | | | |
|---|---|---|---|---|
| 3,269,019 | A * | 8/1966 | Krohn | 33/836 |
| 3,829,977 | A * | 8/1974 | Lambert | 33/836 |
| 4,571,839 | A * | 2/1986 | Burton | 33/836 |
| 5,077,909 | A * | 1/1992 | Cranor | 33/836 |
| 7,207,121 | B2 * | 4/2007 | Wixey | 33/626 |
| 2010/0154238 | A1 * | 6/2010 | Harshbarger et al. | 33/836 |

\* cited by examiner

*Primary Examiner* — G. Bradley Bennett
(74) *Attorney, Agent, or Firm* — The Watson IP Group, PLC; Jovan N. Jovanovic; Vladan M. Vasiljevic

(57) ABSTRACT

The invention concerns a method and device for adjusting the fitting depth of a tool in a tool-holder, in particular in a tool-holder to be banded. The method is characterized in that it consists in performing a prior calibration of a sensing assembly (2) by positioning a sensing slide (4) of said assembly (2) into a bore (V) of a calibrating support (1) and by re-setting a viewing means of said sensing assembly (2), then in positioning the sensing assembly above a tool-holder and moving the adjustable stop of said tool-holder towards the sensing slide (4), so as to determine a travel thereof corresponding to the required fitting depth. The invention is applicable in the field of the environment of machine-tools, more particularly comprising tool-holders to be banded.

8 Claims, 1 Drawing Sheet

METHOD AND DEVICE FOR ADJUSTING THE FITTING DEPTH OF A TOOL IN A TOOL-HOLDER

This invention concerns the field of the environment of machine-tools, in particular numerically-controlled machines, machining centers, transfer line or machines, for high-speed machining, or those requiring high dimensional precision and concentricity, including devices for assembly and disassembly of tools in the tool-holder by thermal expansion, and its object is a method for adjusting the fitting depth of a tool in a tool-holder, in particular in a tool-holder to be banded.

The invention also targets a device to implement this method.

There are currently various devices which permit using banding to assemble a tool in the tool-holder. These banding devices for tool-holder/tool assemblies, with manual or automated intervention for fitting, do not, however, permit precise measurement or positioning and control of the position of a tool, which are becoming essential in the current context of industrial use and preparation of tools.

There are also known pre-adjustment machines, also called pre-adjustment or measurement benches, which make it possible to measure a tool, but these benches are autonomous and are not generally adapted to banding of tools in tool-holders. Consequently, the tool-holder/tool assemblies must be manipulated several times in order to have access to the information necessary to understand said assemblies properly.

In fact, the user must have information about the fitting depth of a tool in a tool-holder. This dimension is generally completely predetermined and must be respected to permit the optimum and safe use of a tool. The fitting depth of a tool in a tool-holder depends on the prior adjustment of a stop of the tool-holder, and this adjustment cannot be made at the time of banding.

In the case of mandrels to be banded, because the diameter of the tool-holder is smaller than that of the tool, it is impossible to adjust the latter before carrying out the banding. In the same way, it is important to know the fitting depth, because the torque transmissible to the tool is directly connected to said fitting depth.

The goal of the present invention is to remedy the drawbacks of the devices known at this time by offering a method for the adjustment of the fitting depth of a tool in a tool-holder, in particular in a tool-holder to be banded, and a device for the implementation of this method permitting precise and reproducible adjustment of a fitting depth and verification of said depth.

For this purpose, the method of adjusting the fitting depth of a tool in a tool-holder, in particular in a tool-holder to be banded, is characterized in that it consists in performing a prior calibration of a sensing assembly by positioning a sensing slide of said assembly into a bore of a calibrating support and by resetting a viewing means of said sensing assembly, then in positioning the sensing assembly above a tool-holder and moving the adjustable stop of said tool-holder towards the sensing slide, so as to determine a travel thereof corresponding to the required fitting depth.

The invention also targets a device for the implementation of this method, characterized in that it includes a calibrating support, a sensing assembly including a body, in which slides a slide cooperating with a viewing means, and a stop ring attached to the body.

The invention will be better understand by means of the following description, which relates to a preferred embodiment, offered as a non-limitative example, and explained with reference to the attached schematic drawings, in which.

Figure 2:
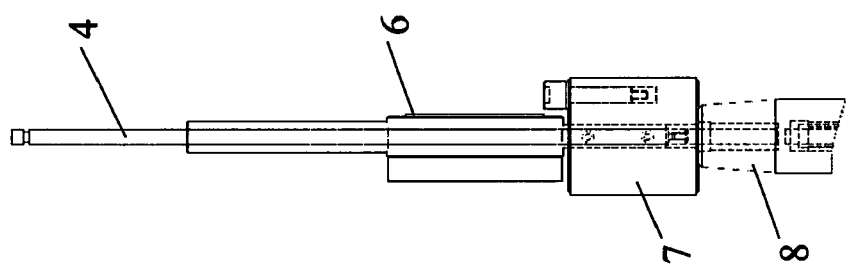
FIG. 2 is a side elevation view of the device according to FIG. 1, without the calibrating support.
Figure 1:
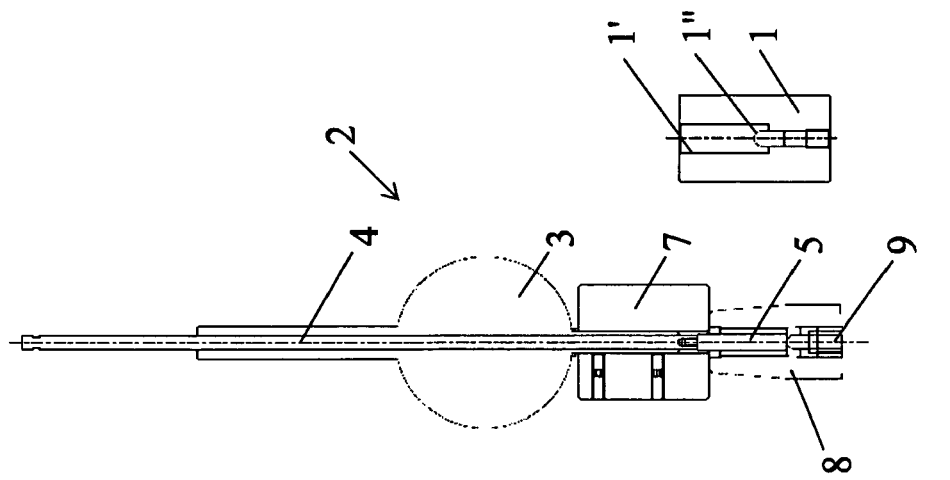
FIG. 1 is a front elevation view and a cross-section view of the device for the implementation of the method according to the invention.

FIGS. 1 and 2 of the attached drawings represent, as an example, a device for adjusting the fitting depth of a tool in a tool-holder.

According to the invention, this device includes a calibrating support 1, a sensing assembly 2 including a body 3, in which slides a sensing slide 4 cooperating with a viewing means 6, and a stop ring 7 attached to the body 3.

According to the invention, this device is intended for the implementation of a method of adjusting the fitting depth of a tool in a tool-holder, in particular in a tool-holder to be banded, consisting in performing a prior calibration of a sensing assembly 2 by positioning a sensing slide 4 of said assembly 2 into a bore 1' of a calibrating support 1 and by resetting a viewing means 6 of said sensing assembly 2, then in positioning the sensing assembly above a tool-holder 8 and moving the adjustable stop 9 of said tool-holder towards the sensing slide 4, so as to determine a travel thereof corresponding to the required fitting depth.

Preferably, and as represented in FIGS. 1 and 2 of the attached drawings, the sensing slide 4 is equipped with an interchangeable sensing tip 5. It is also possible, however, to perform sensing directly using the end of the slide 4 crossing the stop base 7, the latter culminating under the inferior face of this stop ring 7 of a certain length.

According to a characteristic of the invention, the calibrating support 1 is by preference presented in the form of a sleeve equipped with a blind bore 1', in the base of which is mounted an adjustable tip 1". Thus, by acting on the adjustable tip 1", it is possible to adjust perfectly a penetration depth of a rod or similar item introduced into the bore 1' and in particular of the sensing tip 5 or directly of the end of the sensing slide 4.

In the embodiment represented in the attached drawings, the slide 4 is equipped with a sensing tip 5, advantageously mounted at the free end of the sensing slide 4 crossing the stop ring 7. To this effect, the device may be equipped with several interchangeable sensing tips 5 of different lengths. Thus, it is possible to perform verifications of the fitting depth of different lengths by simple adaptation of the corresponding sensing tip. Of course, in such a case, it will be necessary to provide either for a significant adjustment course of the adjustable tip 1" of the calibrating support 1, or for calibrating supports of different heights presenting bores 1' of different depths. Thus it is possible to use the device according to the invention to perform the adjustment of the penetration depth of tools with spigots of different lengths in tool-holders of different dimensions, in particular different fitting lengths.

The connection between the end of the sensing slide 4 culminating in the stop body 7 and the sensing tip 5 is advantageously realized in the form of a screwed connection, by elastic deformation, or similar, the sensing tip 5 being equipped with a shoulder supported against the end of the sensing slide 4 in the service position of said sensing tip 5.

The sensing slide 4, which is in the form of a rod, advantageously cooperates with the viewing means 6 of the sensing assembly 2, either via a mechanical means involving a needle display device, for example through a rack and pinion connection, or via a device for detecting movement through electrical or electronic measurement cooperating with a digital display device. These connections between the sensing slide 4 and the viewing means 6 are known to the person skilled in the art and do not need to be described in greater detail.

The device according to the invention functions advantageously as follows:

After adjustment of position of the adjustable tip 1" in the base of the bore 1' of the calibrating support 1, in order to determine a perfectly defined fitting depth in said bore 1', the sensing assembly 2 with the sensing tip 5 mounted at the end of the sensing slide 4 is displaced above the calibrating support 1 and supported on the latter by the corresponding face of the stop body 7, the sensing tip 5 penetrating the bore 1' to rest against the adjustable tip 1" of the calibrating support 1.

When the sensing assembly 2 is resting on the calibrating support 1, there occurs, when the body of the stop 7 rests against the calibrating support 1 and the sensing tip 5 rests against the adjustable tip 1", a displacement of said sensing tip 5 towards the body 3 of the sensing assembly 2, which has the effect of carrying the sensing slide 4 along a certain length, this displacement being displayed on the viewing means 6.

The calibration of the sensing assembly 2 is then performed by resetting the viewing means 6 or by assigning to this viewing means 6 a predetermined set point.

The determination of a fitting depth of a tool in a tool-holder is done, after having measured the total length of the tool, by subtracting the total length of said tool from the desired exit length or setting for the tool.

When this value is established, the adjustment of the fitting length of a tool in a tool-holder 8 is then performed by positioning the sensing assembly 2 above said tool-holder 8 and applying the corresponding surface of the stop body 7 on the front face of the tool-holder 8. The sensing slide then penetrates, via the sensing tip 5, the corresponding bore of the tool-holder 8, until it contacts the adjustable stop 9 of the latter.

By reading the value indicated on the viewing means 6 of the sensing assembly 2, it is then possible to determine the fitting depth existing in the bore of said tool-holder 8, then adjust the latter by displacement of the adjustable stop 9 of the tool-holder 8 towards the sensing slide 4, until the required fitting depth is obtained.

The sensing assembly 2 may then be retracted and, for example, placed on the calibrating support 1.

After this adjustment, the tool-holder 8 may be mounted in a tool banding device, in which the tool corresponding to the predetermined adjustment may be mounted precisely.

Figure 3:
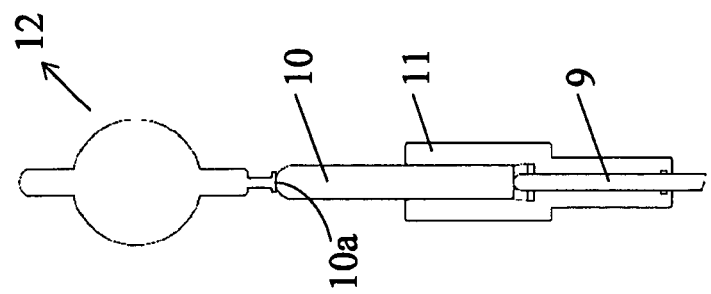
FIG. 3 is a view, at a larger scale, analogous to that of FIG. 1, representing the adjustment of the length of a cutting assembly before verification of the fitting depth of a tool.

The device according to the invention also makes it possible to verify a fitting depth of a tool 10 in a tool-holder whose stop is pre-adjusted (FIG. 3). To this effect, the tool-holder is replaced by a spacer sleeve 11, which is joined on the stop 9 and houses, from the side opposite said stop 9, the tool 10.

By implementation of a means of sensing 12, whose type is known, applied on the free end 10a of the tool 10, it is possible to adjust the length of the cutting assembly consisting of a tool 10, an adjustable stop 9 and a tool-holder, not pictured, replacing the spacer sleeve 11.

After this adjustment, and removal of the tool 10 and the spacer sleeve 11, a tool-holder is placed on the adjustable stop 9 by as a replacement of the sleeve 11. It is then possible to verify, using the sensing assembly according to the invention and according to FIGS. 1 and 2, the fitting depth of the tool 10 and to compare it to the defined set points to guarantee proper functioning of a cutting assembly.

Such an adjustment is necessary when a predefined length of active value of tool is required. In fact, in such a case, it is appropriate to be able to verify that the fitting length of the tool in the tool-holder is still sufficient to meet the requirements of proper functioning.

By means of the invention, it is possible to realize a device for adjusting the fitting length of a tool in a tool-holder, in particular in a tool holder to be banded, permitting, by implementation of a simple method, a completely precise and reproducible adjustment of tool-holders for mounting cutting tools.

Of course, the invention is not limited to the embodiment described and pictured in the attached drawings. Modifications are still possible, including from the point of view of constitution of the various elements or by substitution of technical equivalents, without going outside the field of protection of the invention.

The invention claimed is:

1. Method of adjusting the fitting depth of a tool in a tool-holder, in particular in a tool-holder to be banded, characterized in that it consists in performing a prior calibration of a sensing assembly (2) by positioning a sensing slide (4) of said assembly (2) into a bore (1') of a calibrating support (1) and by resetting a viewing means (6) of said sensing assembly (2), then in positioning the sensing assembly above a tool-holder (8) and moving the adjustable stop (9) of said tool-holder towards the sensing slide (4), so as to determine a travel thereof corresponding to the required fitting depth.

2. Device for implementation of the method according to claim 1, characterized in that it includes a calibrating support (1), a sensing assembly (2) including a body (3), in which slides a sensing slide (4) cooperating with a viewing means (6), and a stop ring (7) attached to the body (3).

3. Device according to claim 2, characterized in that the sensing slide (4) is equipped with an interchangeable sensing tip (5).

4. Device according to claim 2, characterized in that the calibrating support (1) is presented in the form of a sleeve equipped with a blind bore (1'), in the base of which is mounted an adjustable tip (1").

5. Device according to claim 2, characterized in that it is equipped with several interchangeable sensing tips (5) of different lengths.

6. Device according to claim 2, characterized in that it is equipped with several calibrating supports of different heights presenting bores (1') of different depths.

7. Device according to claim 2, characterized in that the connection between the end of the sensing slide (4) culminating in the stop body (7) and the sensing tip (5) is realized in the form of a screwed connection, by elastic deformation, or similar, the sensing tip (5) being equipped with a shoulder supported against the end of the sensing slide (4) in the service position of said sensing tip (5).

8. Device according to claim 2 characterized in that the sensing slide (4), which is in the form of a rod, cooperates with the viewing means (6) of the sensing assembly (2), either via a mechanical means involving a needle display device, for example through a rack and pinion connection, or via a device for detecting movement through electrical or electronic measurement cooperating with a digital display device.

* * * * *